Oct. 24, 1967

D. A. GERARDI 3,348,294

WHEEL MOUNTER

Filed June 20, 1966

*Daniel A. Gerardi*

United States Patent Office 3,348,294
Patented Oct. 24, 1967

3,348,294
WHEEL MOUNTER
Daniel A. Gerardi, 157 Grove St.,
Stamford, Conn. 06902
Filed June 20, 1966, Ser. No. 559,638
2 Claims. (Cl. 29—273)

ABSTRACT OF THE DISCLOSURE

A wheel mounting device having one flat end shaped to engage the exterior of an axle hub and a substantially elongated handle extending outwardly from the said flat end for lifting and sliding a wheel downwardly for mounting. A rotatable sleeve is positioned near the flat end to serve as a member whereupon the wheel openings may be aligned by hand with the axle hub bolts before applying the fastening nuts.

---

The object of this invention is to provide a device that will considerably improve the art. Another object is to make it much easier and much safer to mount a wheel. A further object is to make this device very simple, very efficient and very inexpensive. As commonly known, this operation is still very strenuous and difficult with the existing known tools.

The accompanying drawings and specifications will fully illustrate and describe the invention. And also, similar numerals and characters refer to similar parts throughout.

Figure 1:
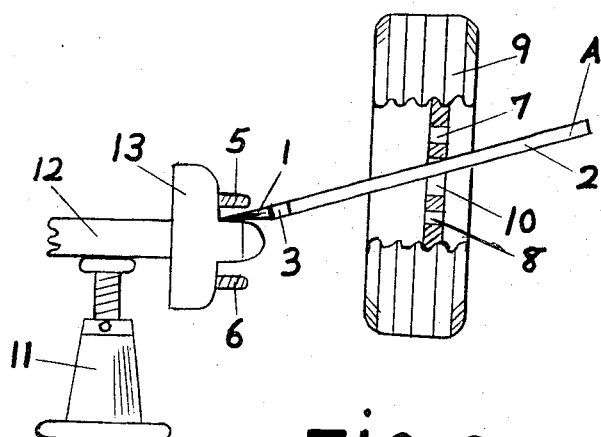
Figure 2:
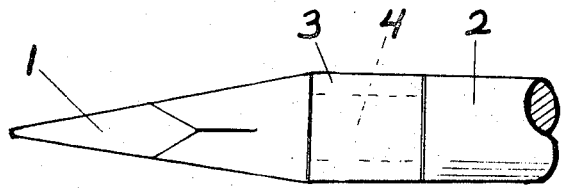
Figure 3:
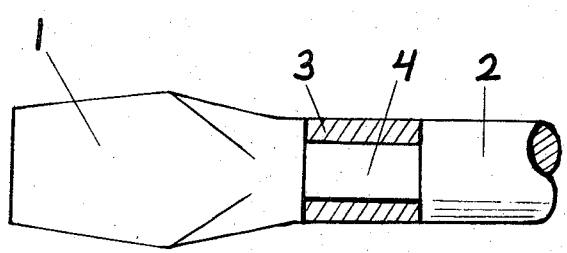

In the drawing: FIGURE 1 is a front view of my device in use. FIGURE 2 is an enlarged side view of the front portion of my device with a sleeve and a notch in broken lines. FIGURE 3 is an enlarged top view of the portion of my device with a cross-cut of a sleeve.

The drawings show in detail the tool A, the flat end 1, the handle 2, the sleeve 3, the notch 4, the axle hub drum studs 5 and 6, the wheel hub stud openings 7 and 8, the wheel 9, the wheel hub drum opening 10, the jack 11, the vehicle axle 12 and the axle hub drum 13.

Referring to the drawings: The tool A is my device or invention. The tool A has a substantially long and slender body made of metal or any other suitable material and formed to be passed through the wheel center opening 10.

The tool A has the flat end 1 tapering outwardly gradually and shaped to engage the exterior center of the axle hub drum 13.

The elongated handle 2 extends outwardly from the flat end 1 and forms a member for lifting and sliding a wheel downwardly and inwardly onto the axle hub drum 13, for mounting.

The rotatable sleeve 3 is positioned onto the notch 4 near the inner side of the flat end 1 and functions as a member whereupon the wheel 9 can be turned by hand in both directions for aligning the wheel stud openings 7 and 8 with the axle hub studs 5 and 6 before applying the fastening nuts. The wheel openings 7 and 8 and the axle hub studs 5 and 6 also represent the openings and studs not shown.

To operate, the tool A is passed through the wheel opening 10, the flat end 1 is engaged to the axle drum 13, the handle 2 is used to lift and to slide the wheel 9 onto the rotatable sleeve 3 whereupon the wheel openings 7 and 8 are aligned by hand with the hub studs 5 and 6, the wheel 9 is then pushed inwardly and firmly secured by applying the fastening nuts and so the wheel 9 is ready for use.

As illustrated and described: The tool A is very easy and very safe to use for mounting a wheel. The tool A is also very simple, very efficient and very inexpensive. The tool A may be changed or modified without departing from the scope thereof. The tool A also represents all devices subject to the very same uses and conditions.

Having described my invention, I hereby make the following claims, substantially as illustrated and described:

1. A wheel mounting tool comprising an elongated lever having first and second ends, said first end defining a handle for insertion through the hub opening of a wheel for elevating and slidably mounting said wheel, said second end defining a flat surface engageable with a wheel hub and serving as a pivot for said lever, and a sleeve rotatably mounted on and substantially the same size and configuration as the lever, said sleeve being positioned adjacent said flat surface and defining means for rotating said wheel to align the wheel stud openings with the hub studs.

2. A wheel mounting tool of the type specified in claim 1, wherein said lever has a reduced portion and said sleeve is rotatably mounted on said reduced portion.

References Cited

UNITED STATES PATENTS

| 70,923 | 11/1867 | Voorhees | 145—50 X |
| 1,494,269 | 5/1924 | Meyers | 29—273 |

FOREIGN PATENTS

| 651,377 | 3/1951 | Great Britain. |
| 681,492 | 2/1930 | France. |

OTHELL M. SIMPSON, *Primary Examiner.*